United States Patent
Rasmussen

[15] 3,681,958
[45] Aug. 8, 1972

[54] HIGH PRESSURE FORMING PRESS
[72] Inventor: Aage Rasmussen, Stony Brook, N.Y.
[73] Assignee: Grumman Aerospace Corporation, Bethpage, N.Y.
[22] Filed: Oct. 15, 1970
[21] Appl. No.: 80,911

[52] U.S. Cl. ........................................72/57, 72/60
[51] Int. Cl. ...........................................B21d 22/10
[58] Field of Search....................72/54, 57, 60, 63

[56] References Cited

UNITED STATES PATENTS

| | | | |
|---|---|---|---|
| 2,756,707 | 7/1956 | Peters | 72/57 |
| 3,031,993 | 5/1962 | Gerard et al. | 72/60 |
| 3,264,854 | 8/1966 | Carlisle | 72/63 |
| 3,290,919 | 12/1966 | Malinak et al. | 72/63 |
| 3,391,559 | 7/1968 | Myers | 72/63 |

FOREIGN PATENTS OR APPLICATIONS

| | | | |
|---|---|---|---|
| 871,251 | 6/1961 | Great Britain | 72/63 |
| 1,167,094 | 11/1966 | Great Britain | 72/57 |

Primary Examiner—Richard J. Herbst
Attorney—Morgan, Finnegan, Durham & Pine

[57] ABSTRACT

An apparatus and method for forming sheet metal. A head platen having a rubber insert and a lower piston casing which accommodates a piston having an anvil adapted to be aligned with the rubber insert are held together by a lock ring. A hydraulic actuation system comprised of a plurality of pistons mounted on the head platen and the piston mounting the anvil operate to impose a concentrated force to press a workpiece mounted on the anvil into the rubber insert.

5 Claims, 5 Drawing Figures

INVENTOR.
AAGE RASMUSSEN
BY
Morgan, Finnegan, Durham & Pine
ATTORNEYS

HIGH PRESSURE FORMING PRESS

FIELD OF THE INVENTION

The invention relates to sheet metal forming presses. More particularly, the invention is directed to a hydraulic flexible die press for forming sheet metal under extremely high pressures.

BACKGROUND OF THE INVENTION

1. Description of the Prior Art

A variety of hydraulic, flexible die sheet metal forming presses are presently in use. However, the conventional presses of this type having the capacity to exert very high working pressures are large heavily built machines. Basically, the prior art high pressure hydraulic flexible die sheet metal sheet presses employ either an hydraulically expansible container or a solid rubber insert to deform the sheet metal workpiece around a form or a die.

The hydraulic flexible die sheet metal presses having hydraulically expansible containers are limited in the amount of pressure which they can exert on the workpiece since the hydraulic fluid transmits the force in all directions equally rather than directing the force primarily to the workpiece. Hence, the force on the workpiece will not be greater than the pressure on any other part of the hydraulically expansible containers. In addition, large structures must be built around the hydraulically expansible containers to react the pressures therein.

In the case of hydraulic presses having solid rubber inserts for deforming a workpiece around a form or die, the prior art lacks a press design capable of generating large forces in a small compact apparatus.

2. Summary of the Invention

It is an object of the present invention to provide a hydraulic rubber die sheet metal press of a small, compact size that is capable of forming parts that would conventionally require the use of a large, heavy-duty press.

To this end, a hydraulic forming press is provided having an upper head platen, a base piston casing, a lock ring and a hydraulic system.

The upper head platen is formed with a centrally disposed cavity into which a rubber insert is fitted. The base piston casing accommodates a single large piston on which an anvil is mounted. The upper head platen and the base piston casing are arranged such that the anvil and rubber insert are in vertical alignment. Both the head platen and base casing have outer flanges of the same diameter.

The lock ring is formed of two virtually identical halves which are mounted for translation into and out of the operative position. Each of the lock ring halves have formed therein an internal recess having a height substantially the same as the combined height of both the head platen flange and the base piston casing flange. In the operative position, the lock ring halves are translated into abutting relationship wherein the internal recesses thereof conform to the flanges of the head platen and base casing.

The press hydraulic system includes a plurality of hydraulic piston cylinders mounted on the head platen. The piston rods of the piston cylinders transpierce the head platen and are fixedly secured in the base piston. Thus, by introducing pressurized fluid into the piston chambers on the side of the lower piston face, the head platen is forcibly lowered into the operative position. The hydraulic system also includes means for introducing pressurized fluid into the bottom of the base casing to force the base piston upwardly.

Operationally, a workpiece or a die is first placed on the anvil. Next, fluid under pressure is introduced into the bottom of the piston cylinders on the platen head to operate against the lower faces of the pistons. As a consequence, the head platen is lowered thereby forcing the rubber insert against the anvil to initially deform the workpiece. After a pressure equilibrium condition is reached, the lock ring is moved into engagement with the flanges on the base casing and the head platen. Next, fluid under pressure is pumped into the base casing piston chamber to drive the piston upwardly thereby forcing the workpiece and the die further into the rubber insert. The relatively large area of the piston surface on which the fluid is operating in comparison to the small anvil surface area affords a condition wherein the entire force on the piston is concentrated on the anvil.

DESCRIPTION OF THE DRAWINGS

The present invention and the attendant advantages will become better understood as explained with reference to the accompanying drawings wherein.

DESCRIPTION OF THE PREFERRED EMBODIMENT

Figure 1:
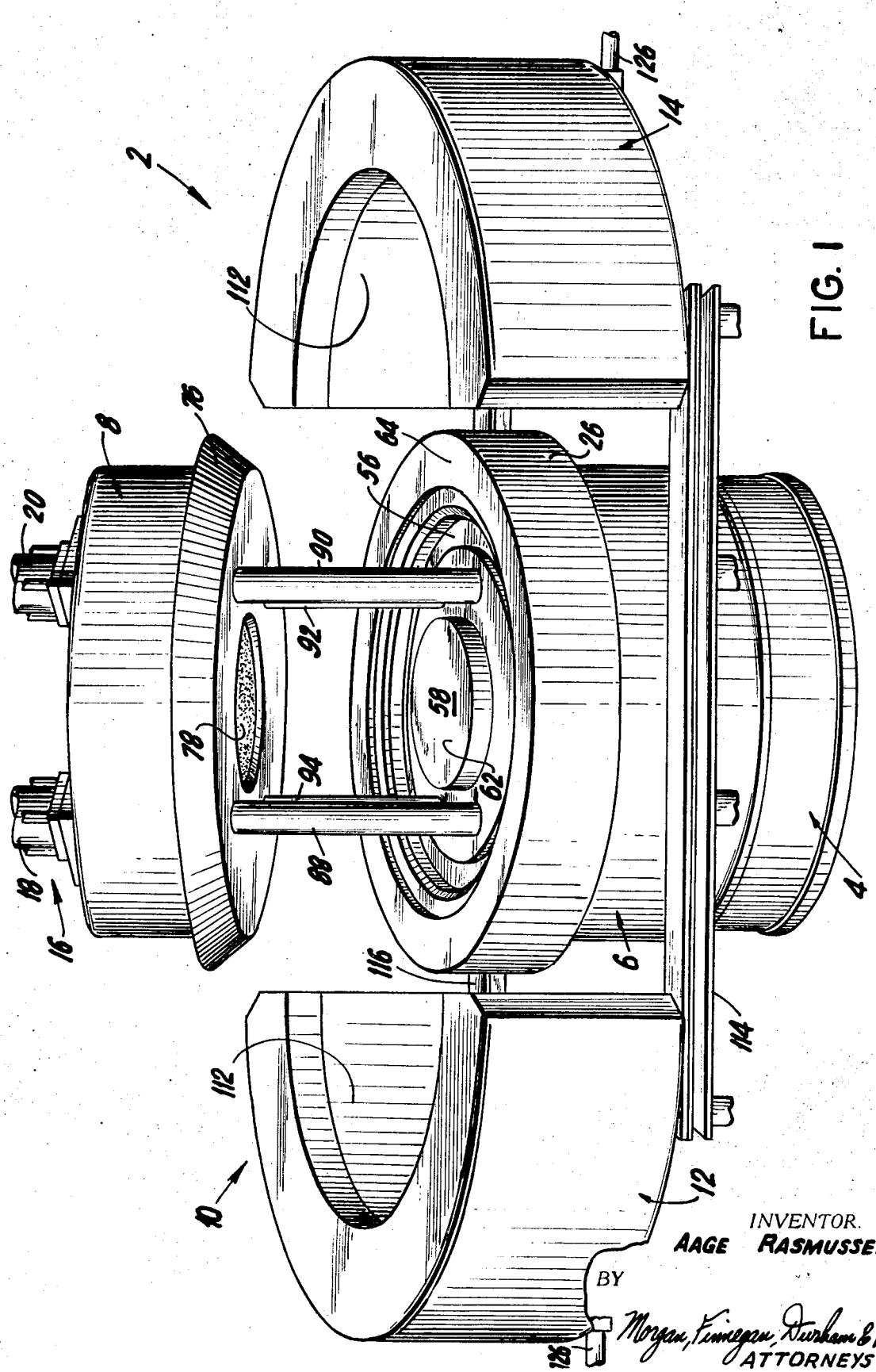
FIG. 1 is a perspective view of the hydraulic press constituting the present invention.

The press 2 of the present invention is shown in FIG. 1 in the inoperative open position.

The press 2 is mounted on a pedestal 4 and is comprised of a base casing 6, a head platen 8 and a lock ring 10 having complementary mating clamp members 12 and 14 which retain the head platen 8 in contact with the base casing 6 and react the force imposed thereon during the forming operation. The press 2 is also provided with an initial hydraulic actuation assembly 16 which consists of hydraulic actuation cylinders 18, 20, 22, 24 (best seen in FIG. 3).

Figure 2:
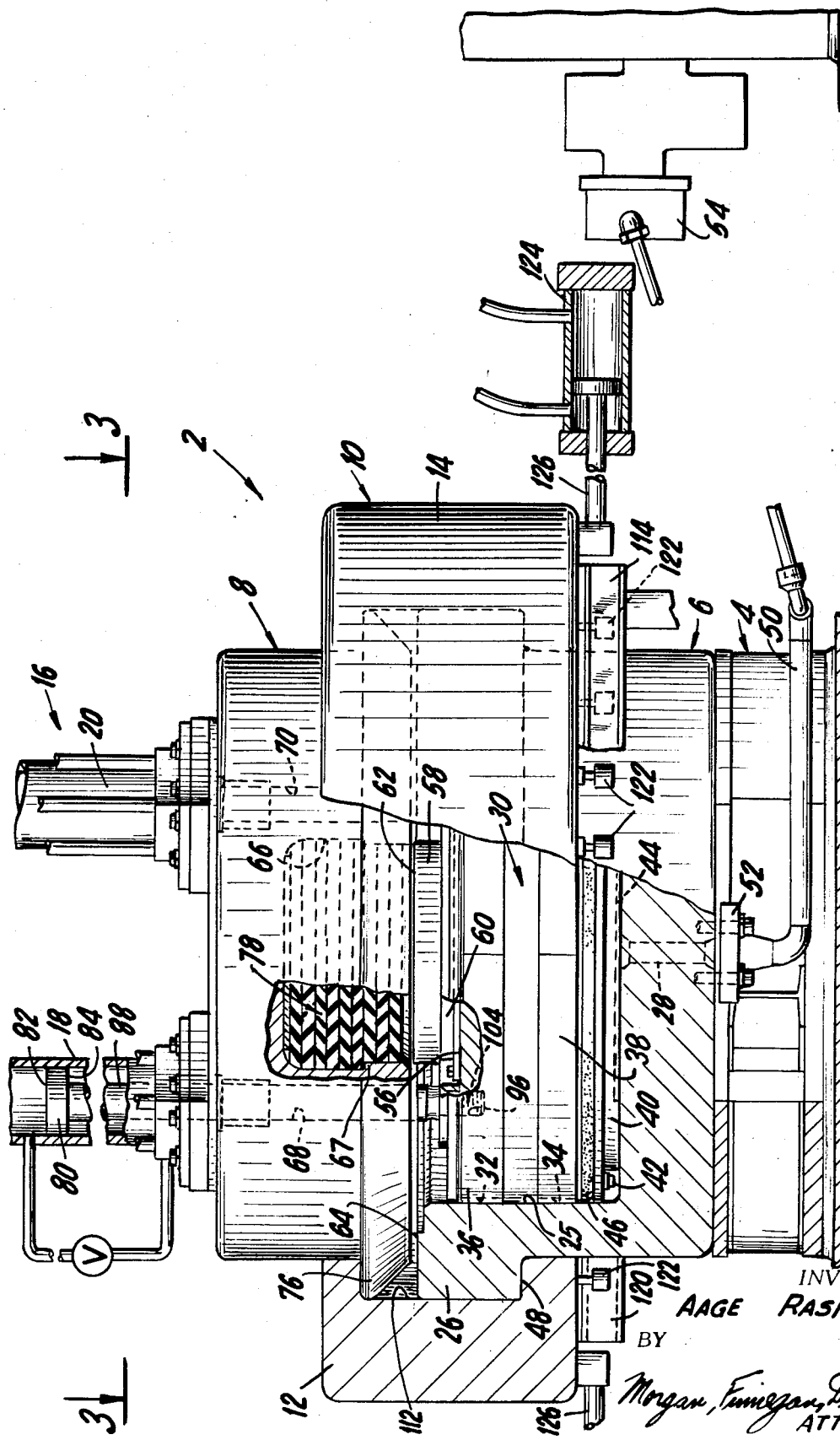
FIG. 2 is an elevational view, partly in section, of the hydraulic press shown in FIG. 1.

As best seen in FIG. 2, the base casing 6 is formed with an inner chamber 25, an outer flange 26 and a centrally disposed fluid passage 28. The inner chamber 25 is sized to slidably accommodate a piston 30. Annular recesses 32 and 34 are formed in the surface of the piston 30 for rings 36 and 38. The rings 36 and 38 surround the piston 30 and enhance wear and alignment thereof. A base plate 40 is attached to the piston 30 by any suitable means, such as bolts 42. The base plate 40 is configured with a central cavity 44 to facilitate the entry of actuation fluid into chamber 25.

An annular seal 46 is arranged around the periphery of the piston 30 to prevent the escape of hydraulic actuation fluid. In practice it has been found that an elastomeric seal or a plurality of V-shaped elastomeric seals in tandem located in proximity to the base plate 40 is particularly suitable.

The outer flange 26, shown in FIG. 2, is integrally formed with the base casing 6. The flange 26 is configured to fit within the lock ring 10 such that the lower surface 48 of flange 26 provides a surface for the lock ring 10 to grip.

The centrally disposed fluid passage 28 extends from the piston chamber 25 to the exterior of the base casing 6 to afford communication between the piston chamber 25 and a fluid source under pressure. As seen in FIG. 2, high pressure fluid hose 50 from a pressurized fluid source 54 is connected to the fluid passage 28 by fluid coupling 52.

Mounted on the center of the piston upper surface 56 is an anvil 58, seen in FIGS. 1 and 2, which rests on an anvil support 60, seen in FIG. 2. In practice it has been found that the anvil support should be fixedly attached to the piston upper surface 56 by a known bolt and dowel arrangement and the anvil 58 mounted on the anvil support 60 by a further bolt and dowel arrangement. The elevation of the upper surface 62 of the anvil 58 is slightly above the elevation of the upper surface 64 of the base casing 6. The anvil 58 is the surface on which the workpieces to be formed by the press 2 are placed.

The head platen 8, best seen in FIG. 2, is sized to mate with the base casing 6 and, hence is similarly configured. The head platen 8 is formed with a centrally disposed cavity 66, best seen in FIG. 2, four through going holes 68, 70, 72, 74, best seen in FIG. 3, and an outer flange 76.

The centrally disposed cavity 66 is formed with a shoulder 67 and filled with a hard rubber insert 78. A variety of rubber inserts can be used, depending on the particular application, however, in practice, about an eighty durometer rubber insert is particularly satisfactory for forming small airplane parts.

The outer flange 76 on the head platen 8 is formed with the same outer diameter as the flange 26 on the base casing. Together the flanges 76 and 26 provide the surfaces which the lock ring 10 grips to retain the base casing 6 and the head platen together during the press forming operation.

Figure 3:
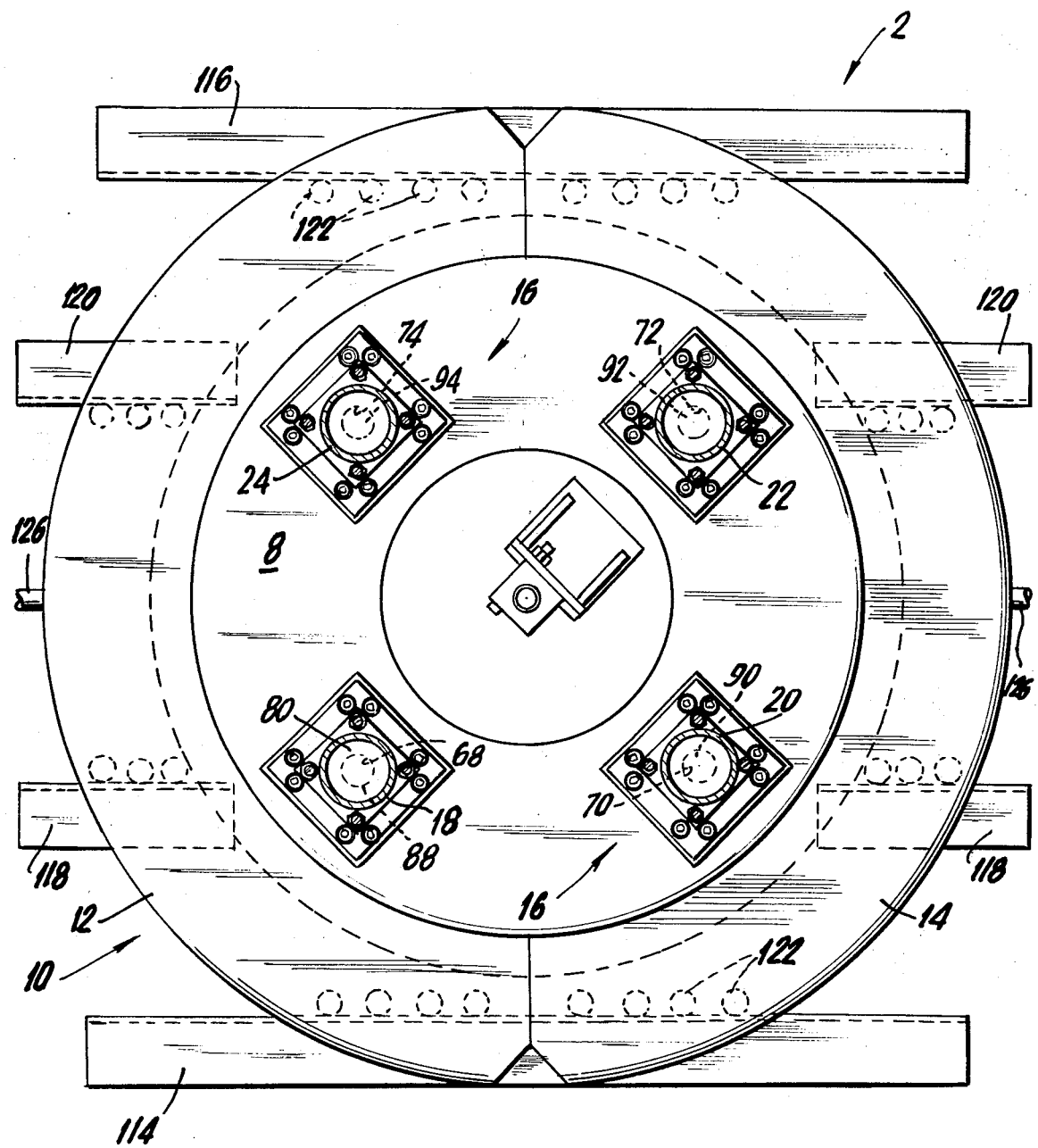
FIG. 3 is a sectional plan view of the hydraulic press through line 3—3 of FIG. 2.
Figure 4:
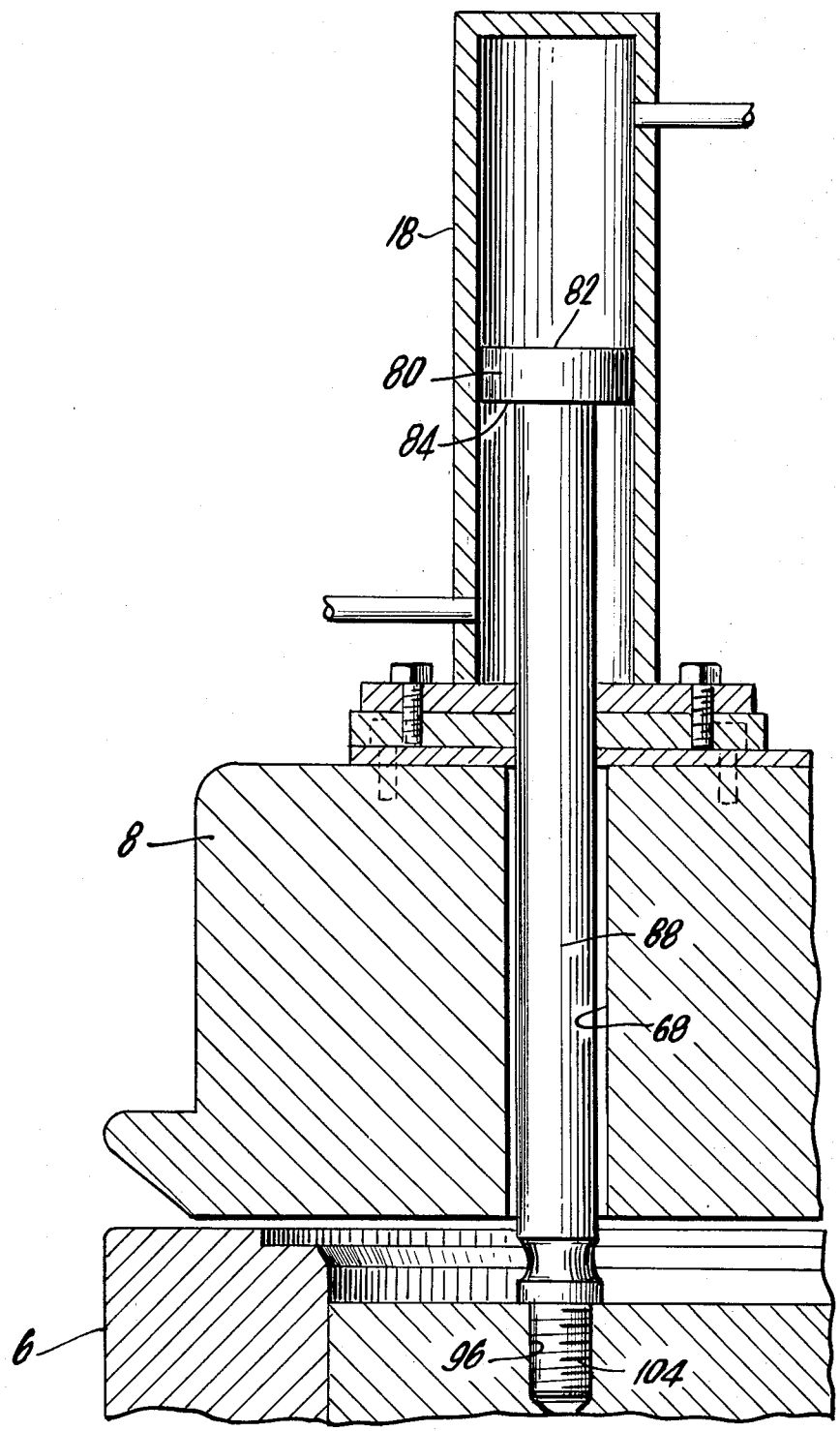
FIG. 4 is a partial sectional elevational view of one of the hydraulic piston cylinders on the platen head.

The initial hydraulic actuator assembly 16, seen in FIGS. 2, 3 and 4, is comprised of four actuator piston cylinders 18, 20, 22, 24 having piston rods 88, 90, 92, 94 and pistons 80. Each piston cylinder 18, 20, 22, 24 is fixedly mounted on the upper surface of the head platen 8 over a respective through-going hole 68, 70, 72, 74. The piston rod 88, 90, 92, 94 associated with each cylinder 18, 20, 22, 24 extends through the through-going holes 68, 70, 72, 74 over which the respective cylinder is mounted and are fixedly attached to the piston 30 of the base casing 26. However, the piston rods 88, 90, 92, 94 are slidably arranged in the through-going holes 68–74 to allow the head platen 8 to move uninhibitedly. Any means can be used to secure the piston rods 88–94 to the piston 30, such as threaded holes 96 in the piston 30 adapted to fit the threaded ends 104 of the piston rods 88–94, as best seen in FIG. 4. Movement of the head platen 8 is effected by fluid in the cylinders 18, 20, 22, 24 acting on either of the respective faces of the pistons 80. If fluid acts on the top face 82 of the pistons 80, the cylinders 18, 20, 22, 24 and head platen 8 move upwardly. If the fluid acts against the bottom face 84 of the pistons 80, the cylinders 18, 20, 22, 24 and head platen 8 move downwardly.

The lock ring 10, seen in FIGS. 1, 2 and 3, is designed to grip the head platen flange 76 and the base casing flange 26 during the forming operation. Each of the complementary mating clamp members 12 and 14 is semi-circular in planform and each is formed with an inner recess 112 into which the flanges 76 and 26 can fit. The clamp members 12 and 14 are slidably mounted on rails 114, 116, 118, 120, seen in FIG. 3. Rollers 122, best seen in FIG. 2, depend from the clamp members 12 and 14 and insure the alignment of the clamp members 12 and 14 as they travel on the rails 114–120. Actuators, such as fluid actuators 124, are adapted to move the clamp members 12 and 14. The actuator rods 126 of the actuators 124 connect directly to each respective clamp member 12 and 14.

Figure 5:
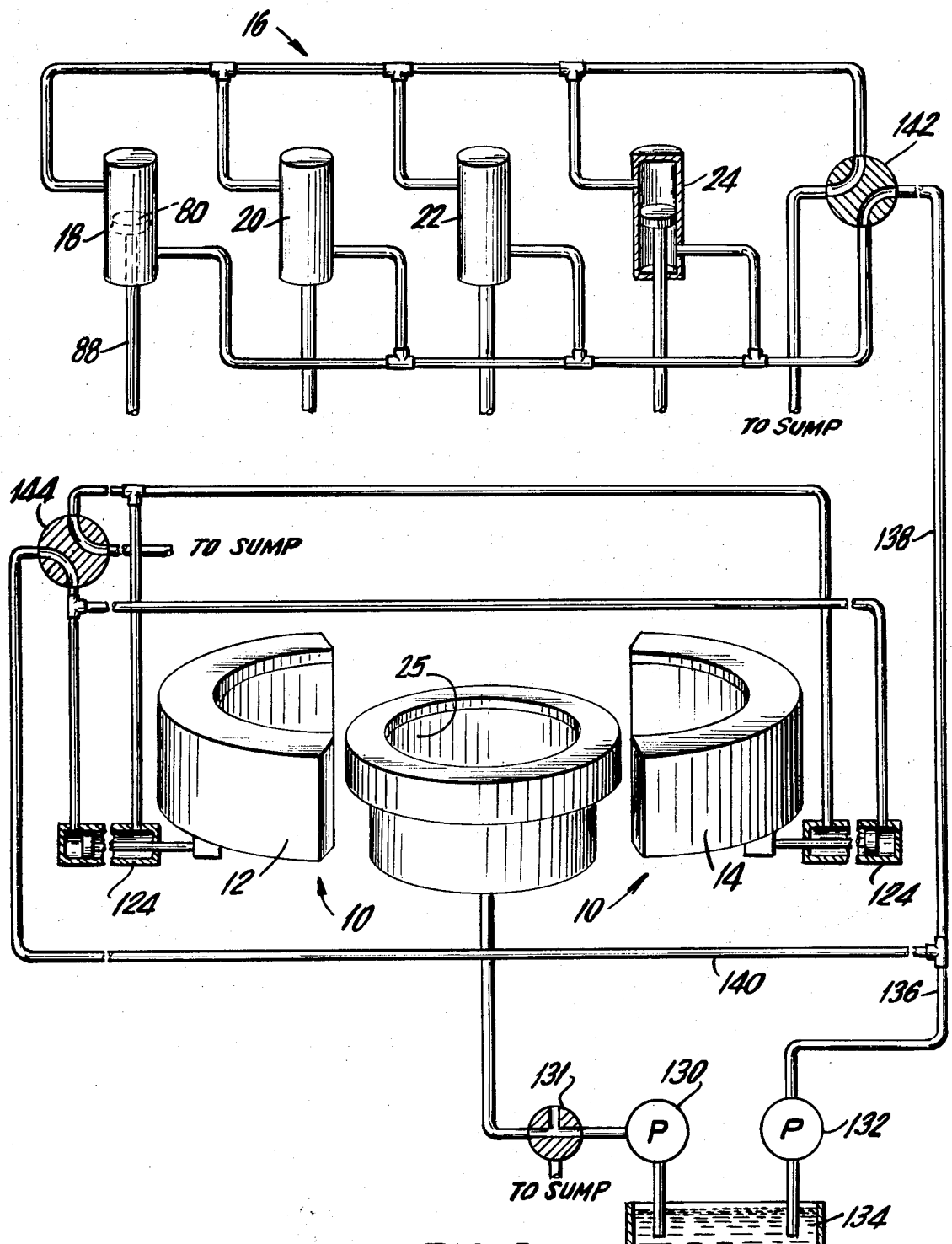
FIG. 5 is a simplified hydraulic control system for the hydraulic press.

A schematic of a system for controlling the machine function of the press 2 is shown in FIG. 5. The system depicted is the simplest operative form and does not include any of the system safety devices such as hydraulic fuses which are necessary for practical operation. A high pressure pump 130 and a low pressure pump 132 are connected with a fluid source 134. It should be noted that independent fluid sources could be provided. Pump 130 supplies the high pressure fluid for the fluid hose 50 which delivers the fluid to the piston chamber 25 in the base casing 6. A valve 131 in the hose 50 is provided to afford selective communication between the piston casing 25 and either the pump 130 or the system sump.

The low pressure pump 132 delivers fluid to both the initial hydraulic actuators 18, 20, 22, 24 of assembly 16 and the actuator cylinders 124 which control the lock ring 10. The line 136 from the pump 132 connects with branched lines 138 and 140 which extend to the initial hydraulic actuator assembly 16 and the lock ring actuator cylinders 124 respectively. Valves 142 and 144 are provided for lines 138 and 140 respectively to afford selective communication between the piston chambers and either the pump 132 or the system sump.

In operation, the hydraulic press 2 is first loaded either manually or automatically by setting a workpiece and die or the anvil 58, as seen in FIGS. 1 or 2. Next, the hydraulic system is engaged by providing communication between the low pressure pump 132 and the bottom of each of the initial hydraulic actuators 18, 20, 22 and 24. As the fluid enters the bottom of the initial hydraulic actuators 18, 20, 22 and 24, the head platen 8 is forced downwardly since the piston rods 88, best seen in FIG. 4, are fixedly secured to the piston 30. The workpiece and die are forced into the rubber insert 78 until a pressure equilibrium is reached. At or near the point wherein the flange 76 is below the top of the recess 112 in the lock ring 10, a signal is sent by any suitable conventional means to valve 144 to provide communication between the hydraulic actuators 124 and the low pressure pump 132. The force of the fluid on the outside face of the pistons of cylinders 124 forces the lock ring halves 12 and 14 into the operative position wherein the recess 112 in the lock ring assembly 10 surrounds and grips the base casing flange 26 and the head platen flange 76.

After the lock ring halves 12 and 14 engage to secure the head platen 8 to the base casing 6, a signal is sent to valve 131 to provide communication between the high pressure pump 130 and the piston chamber 25. Again, any conventional signal or relay means can be used to regulate the valves 131. Fluid from the high pressure pump 131 is then introduced into piston chamber 25 to force the piston 30 upwardly and, as a consequence, drive the workpiece and die further into the rubber insert 78. The upward motion of the piston 30 acts to force the piston in the initial hydraulic actuation cylinders 18, 20, 22 and 24 further upwardly, hence both the initial and final hydraulic actuation systems are operating with each other rather than against each other. Since the area of the face of the piston 30 is large in comparison to the area of the anvil, the composite force of the hydraulic fluid operating on the piston face will be transferred to the smaller area anvil.

In practice it has been found that an anvil 58 having a surface area 250 square inches and a piston 30 having a surface area of 1,000 square inches will provide a design which delivers a force to the rubber insert 78 four times the hydraulic force at the lower face of the piston 30. Consequently, a high pressure pump 130 designed to deliver hydraulic fluid at 5,000 psi to piston chambers is all that is needed to produce a forming pressure of 20,000 psi at the anvil 58 and rubber insert 78.

Practice has also taught that a low pressure pump 132 capable of generating a hydraulic pressure of about 1,200 –1,500 psi is suitable for operating the initial hydraulic actuator assembly 16 and the lock ring assembly 10.

What is claimed is:

1. A press for forming sheet metal parts comprising:
a base piston chamber;
a vertically movable piston in the base piston chamber;
an anvil on the vertically movable piston for supporting a workpiece and die;
an outer peripheral flange at the top of the base piston chamber;
a vertically movable head platen having a centrally disposed cavity;
elastic means in the cavity for pressing the workpiece against the die to conform the configuration of the workpiece to the die configuration;
an outer peripheral flange on the bottom of the head platen;
a plurality of hydraulic piston actuators, the cylinders of which are fixedly mounted on the head platen and the piston rods of which slidably transpierce the head platen and are fixedly secured to the piston in the base casing;
means for selectively introducing hydraulic fluid into said piston cylinders on either side of the piston to thereby raise and lower the head platen
whereby lowering the head platen to contact the vertical piston produces an initial force for pressing the workpiece and die into the means in the cavity; and
means for producing a final force of a greater magnitude than the initial force for further pressing the workpiece and die into the elastic means.

2. A press for forming sheet metal parts comprising:
a vertically movable piston in the base piston chamber;
an anvil on the vertically movable piston for supporting a workpiece and die;
an outer peripheral flange at the top of the base piston chamber;
a vertically movable head platen having a centrally disposed cavity;
elastic means in the cavity for pressing the workpiece against the die to conform the configuration of the workpiece to the die configuration;
an outer peripheral flange on the bottom of the head platen;
a first hydraulic system comprising a plurality of hydraulic piston actuators, the cylinders of which are fixedly mounted on the head platen and the piston rods of which slidably transpierce the head platen and are fixedly secured to the piston in the base casing;
means for selectively introducing hydraulic fluid into the first hydraulic system piston cylinders on either side of the piston to thereby raise and lower the head platen;
whereby lowering the head platen to contact the vertical piston produces an initial force for pressing the workpiece and die into the means in the cavity; and
a second hydraulic system for moving the vertically movable piston in the base piston chamber for producing a final force of a greater magnitude than the initial force for further pressing the workpiece and die into the elastic means.

3. A press as in claim 2 wherein the lock ring is comprised of mating half rings and further comprising means to mount the lock ring halves for translation into and out of engagement with the flanges of the head platen and the base casing and a third hydraulic system to translate the lock rings halves on the mounting means.

4. A press as in claim 3 further comprising a source of low pressure hydraulic fluid for the first and third hydraulic systems and a source of high pressure hydraulic fluid for the second hydraulic system.

5. A press as in claim 4 wherein the surface area of the anvil is one-quarter times the bottom surface area of the piston mounting the anvil.

* * * * *

PO-1050
(5/69)

UNITED STATES PATENT OFFICE
CERTIFICATE OF CORRECTION

Patent No. 3,681,958      Dated August 8, 1972

Inventor(s) Aage Rasmussen

It is certified that error appears in the above-identified patent and that said Letters Patent are hereby corrected as shown below:

In claim 2, after "comprising:" add the element -- a base piston chamber; -- .

Signed and sealed this 20th day of February 1973.

(SEAL)
Attest:

EDWARD M. FLETCHER, JR.
Attesting Officer

ROBERT GOTTSCHALK
Commissioner of Patents